(12) United States Patent
Clarke et al.

(10) Patent No.: US 11,489,741 B2
(45) Date of Patent: Nov. 1, 2022

(54) SYSTEMS AND METHODS FOR EXTERNAL SYSTEM INTEGRATION

(71) Applicant: LIVEPERSON, INC., New York, NY (US)

(72) Inventors: Fred Clarke, Bellevue, WA (US); Andrew Lader, Redmond, WA (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/533,467

(22) Filed: Nov. 23, 2021

(65) Prior Publication Data
US 2022/0173984 A1 Jun. 2, 2022

Related U.S. Application Data

(63) Continuation of application No. 16/897,949, filed on Jun. 10, 2020, now Pat. No. 11,218,387.

(60) Provisional application No. 62/860,518, filed on Jun. 12, 2018.

(51) Int. Cl.
*H04L 41/5074* (2022.01)
*H04L 41/0631* (2022.01)
*H04L 41/16* (2022.01)

(52) U.S. Cl.
CPC ........ *H04L 41/5074* (2013.01); *H04L 41/065* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 10,496,905 B2 | 12/2019 | Solomon | |
| 11,218,387 B2 | 1/2022 | Clarke et al. | |
| 2014/0006861 A1 | 1/2014 | Jain | |
| 2016/0360466 A1 | 12/2016 | Barak et al. | |
| 2017/0344889 A1 | 11/2017 | Sengupta | |
| 2018/0260760 A1 | 9/2018 | Srivastava | |
| 2018/0285768 A1* | 10/2018 | Karuppasamy | G06N 20/00 |
| 2018/0322403 A1 | 11/2018 | Ron et al. | |
| 2018/0367480 A1* | 12/2018 | Housman | G06F 40/247 |
| 2019/0026365 A1 | 1/2019 | Karuppasamy | |
| 2019/0050875 A1* | 2/2019 | McCord | G06F 40/30 |
| 2019/0066694 A1 | 2/2019 | Hirzel | |
| 2019/0103111 A1 | 4/2019 | Tiwari et al. | |
| 2019/0141191 A1* | 5/2019 | Kwak | H04M 3/5166 |
| 2019/0347668 A1* | 11/2019 | Williams | H04L 67/566 |
| 2020/0077155 A1 | 3/2020 | Bryant | |
| 2020/0090056 A1* | 3/2020 | Singhal | G06N 20/20 |
| 2020/0097563 A1* | 3/2020 | Alexander | G06F 16/61 |
| 2020/0099633 A1 | 3/2020 | D'Agostino | |
| 2020/0136928 A1 | 4/2020 | Sethi | |
| 2020/0259891 A1 | 8/2020 | Abraham | |

(Continued)

OTHER PUBLICATIONS

International Search Report and Written Opinion for PCT Application No. PCT/US2020/036990 dated Sep. 21, 2020, 12 pages.

(Continued)

*Primary Examiner* — Jonathan A Bui
(74) *Attorney, Agent, or Firm* — Polsinelli LLP

(57) ABSTRACT

The present disclosure relates generally to facilitating routing of communications across external systems. More specifically, techniques are provided to dynamically route issue tracking tickets to disparate endpoints based on the content of the ticket.

21 Claims, 12 Drawing Sheets

(56) References Cited

U.S. PATENT DOCUMENTS

2020/0341970 A1   10/2020  Rodrigues
2020/0344185 A1*  10/2020  Singaraju ............. G06K 9/6267
2020/0382450 A1*  12/2020  Vaughn .................. H04L 51/02
2020/0382464 A1*  12/2020  Keller ..................... H04W 4/12

OTHER PUBLICATIONS

Final Office Action dated Dec. 7, 2020 for U.S. Appl. No. 16/897,949, 13 pages.
Non-Final Office Action dated Apr. 27, 2021 for U.S. Appl. No. 16/897,949, 14 pages.
Notice of Allowance dated Aug. 26, 2021 for U.S. Appl. No. 16/897,949, 14 pages.

* cited by examiner

SYSTEMS AND METHODS FOR EXTERNAL SYSTEM INTEGRATION

CROSS-REFERENCE TO RELATED APPLICATIONS

This application is a continuation of U.S. patent application Ser. No. 16/897,949 filed Jun. 10, 2020 which claims the benefit of U.S. Provisional Patent Application No. 62/860,518, filed Jun. 12, 2019, both of which are hereby incorporated by reference in their entirety.

FIELD

The present disclosure relates generally to facilitating routing of communications. More specifically, techniques are provided to dynamically route issue messages, such as tracking tickets, to disparate endpoints using artificial intelligence (AI).

FIELD

The present disclosure relates generally to facilitating routing of communications. More specifically, techniques are provided to dynamically route issue messages, such as tracking tickets, to disparate endpoints using artificial intelligence (AI).

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain embodiments of the present disclosure include a computer-implemented method. The method may include receiving a message from a messaging system. The message is associated with a user. The message represents an issue that the user wants resolved. The method further includes analyzing the message to identify an intent associated with the issue. The intent corresponds to the issue and a possible resolution. The method further comprises determining whether a similar issue is represented in a different message. The method further comprises determining a resolution associated with the similar issue. The method further comprises analyzing the associated resolution. The method further comprises automatically determining an action to be taken. Automatically determining includes applying a rule and artificial intelligence to the intent and the analyzed resolution. The action is associated with an increased likelihood for possible resolution of the issue. The method further comprises executing the action.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
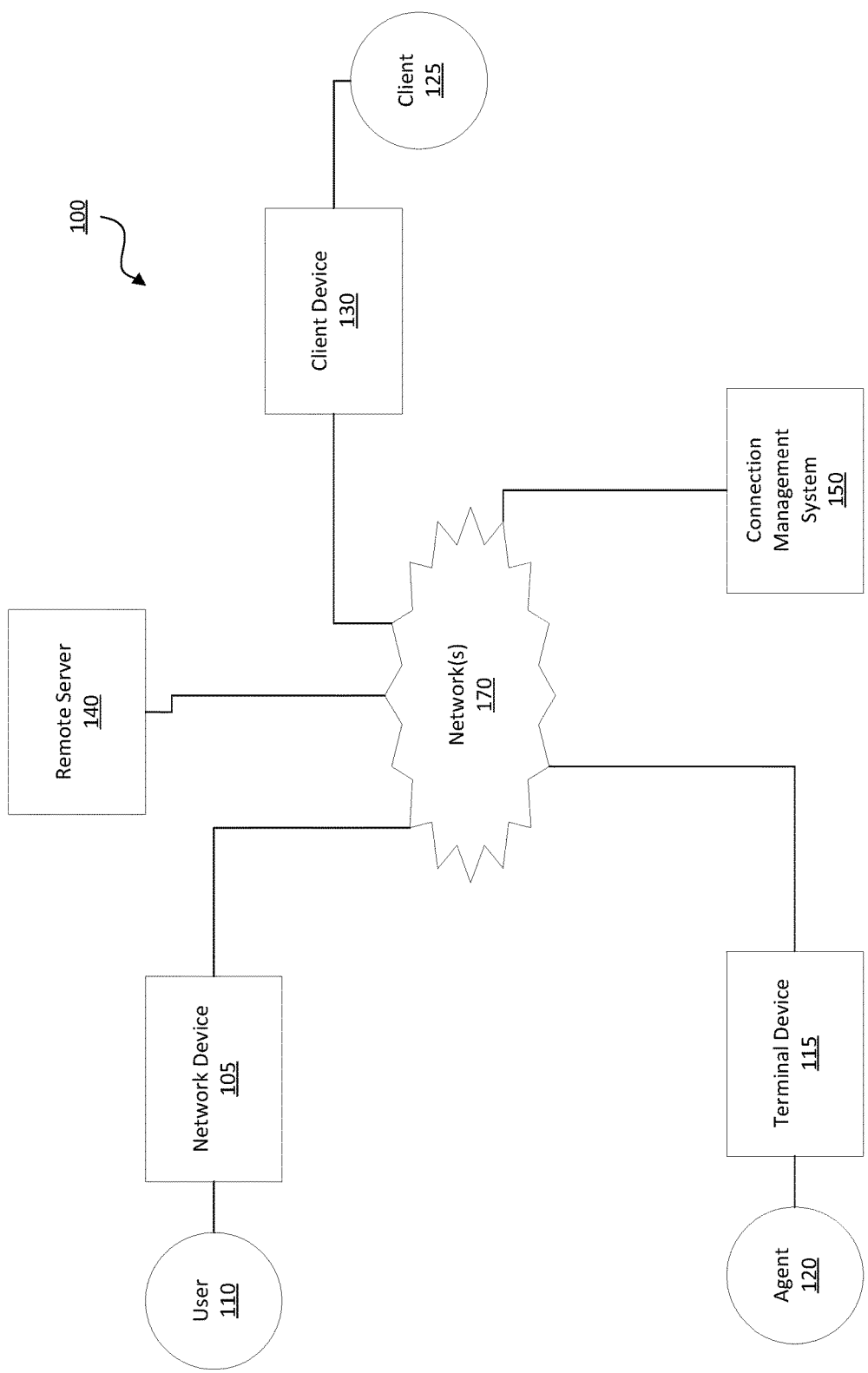
FIG. 1 shows a block diagram of an embodiment of a network interaction system.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can be an individual browsing a web site or accessing an online service provided by a remote server 140. A client 125 can be an entity that provides, operates, or runs the web site or the online service, or individuals employed by or assigned by such an entity to perform the tasks available to a client 125 as described herein. The agent 120 can be an individual, such as a support agent tasked with providing support or information to the user 110 regarding the website or online service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a representative employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
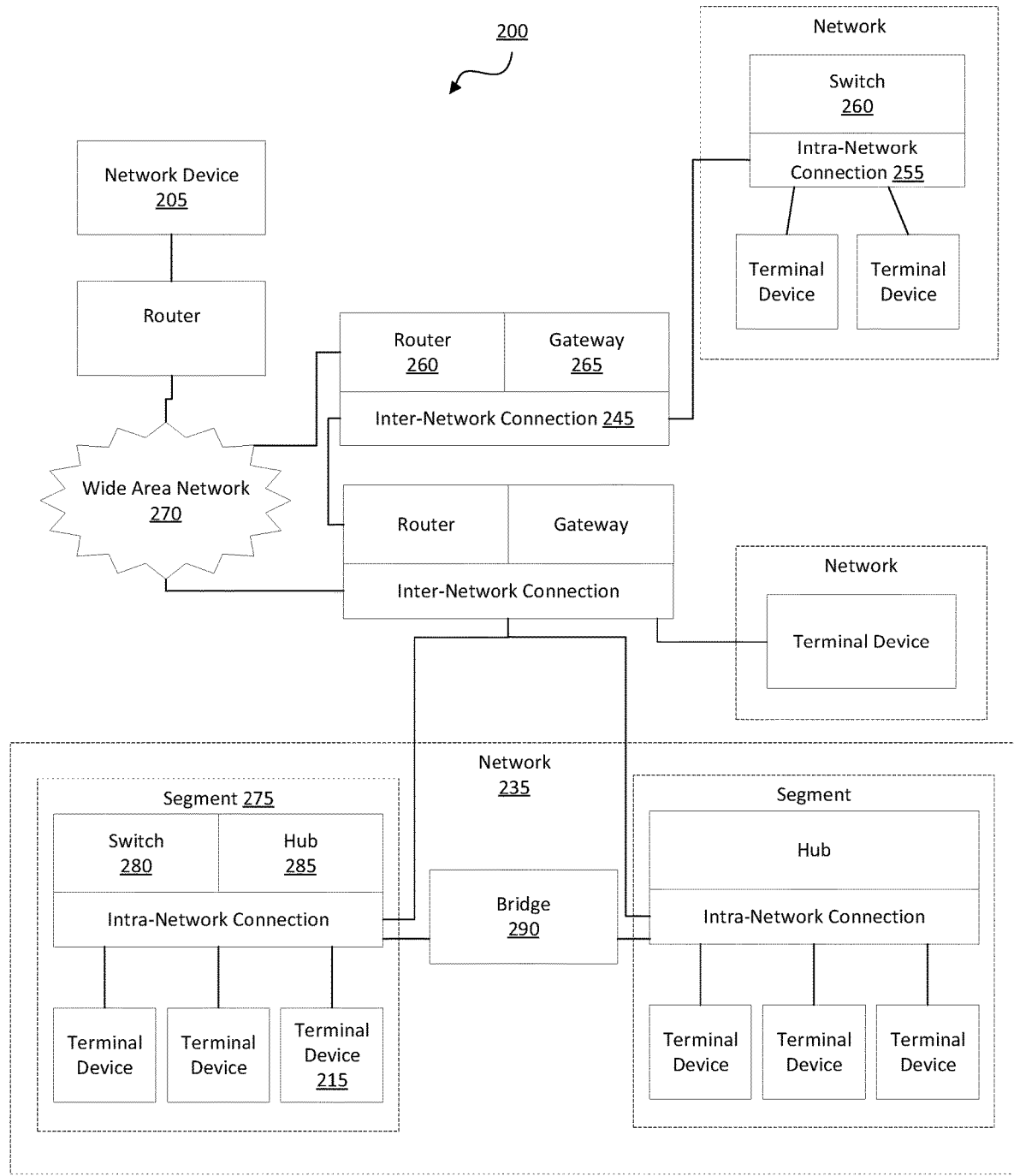
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
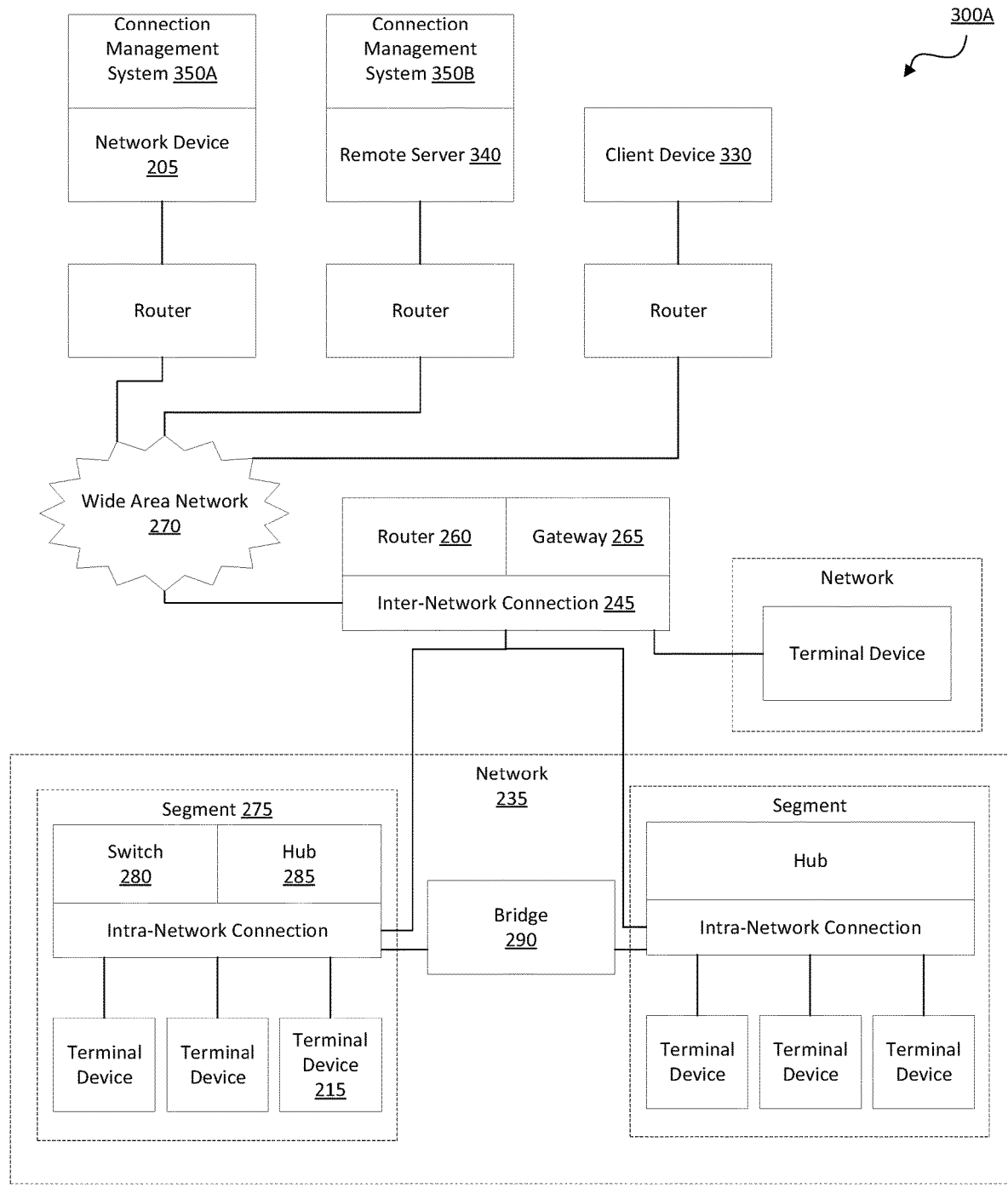
FIGS. 3A-3C show block diagrams of other embodiments of a network interaction system that includes a connection management system.
Figure 3B:
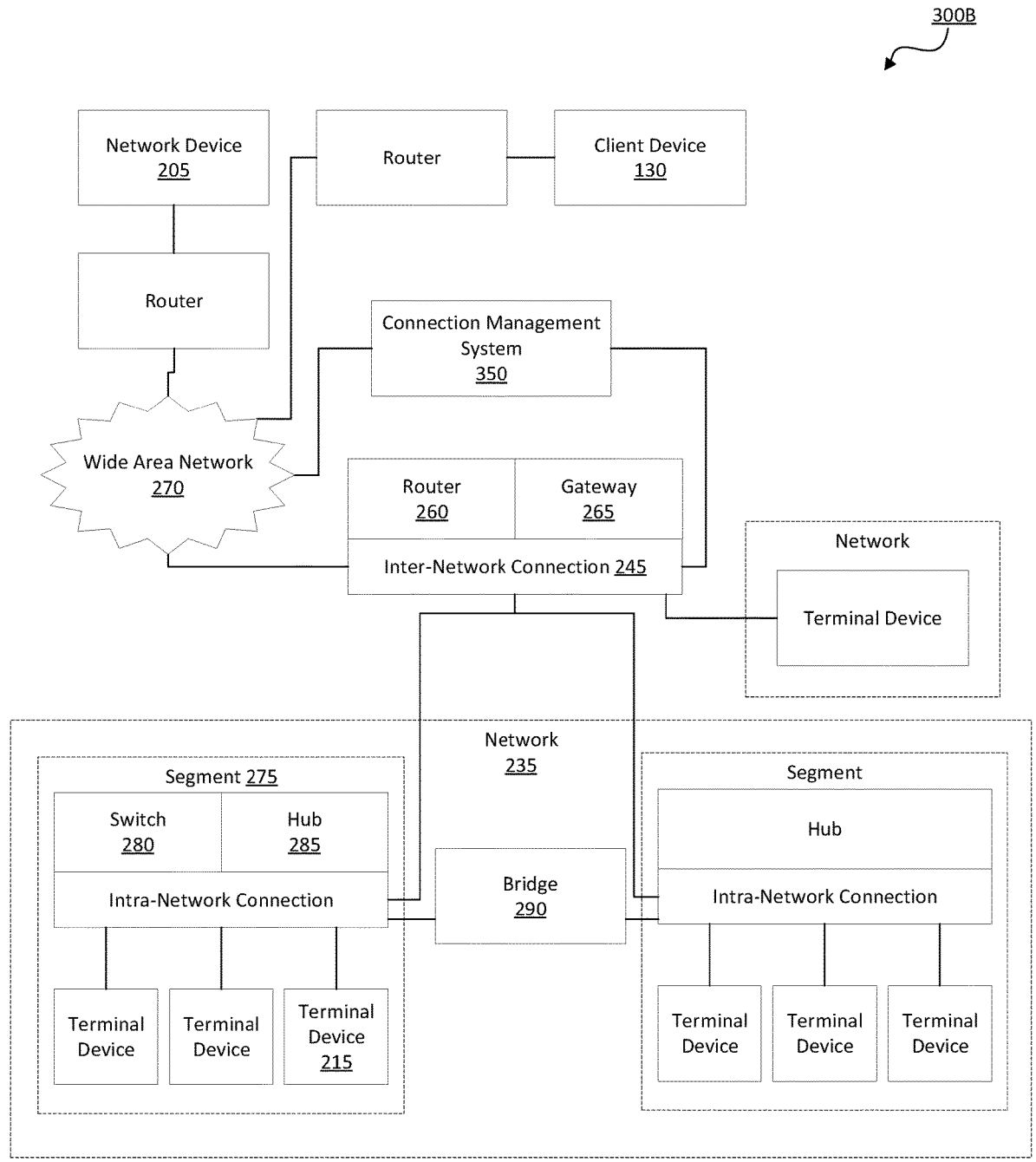
Figure 3C:
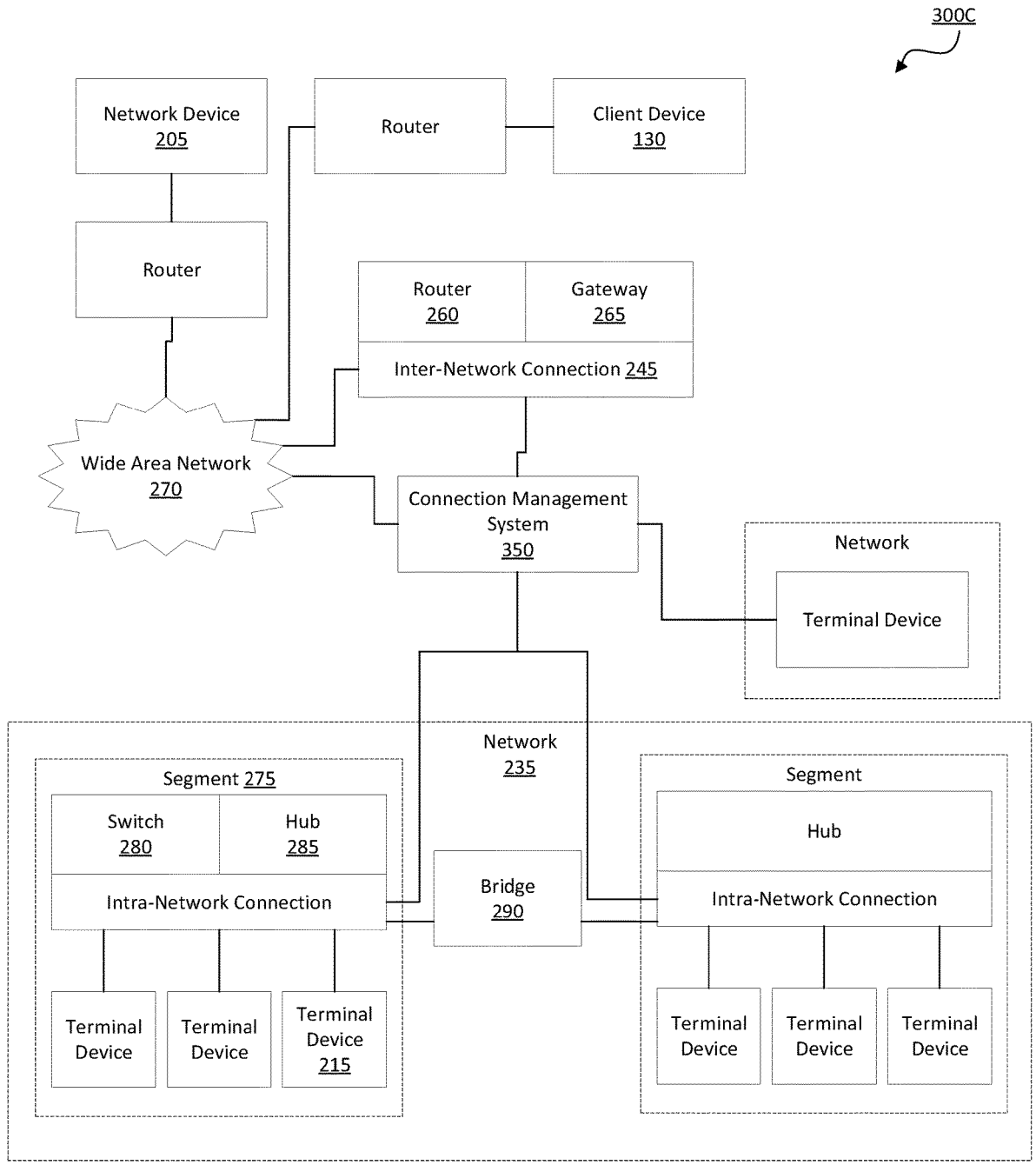

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 350b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, connection management system 350b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address.

Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
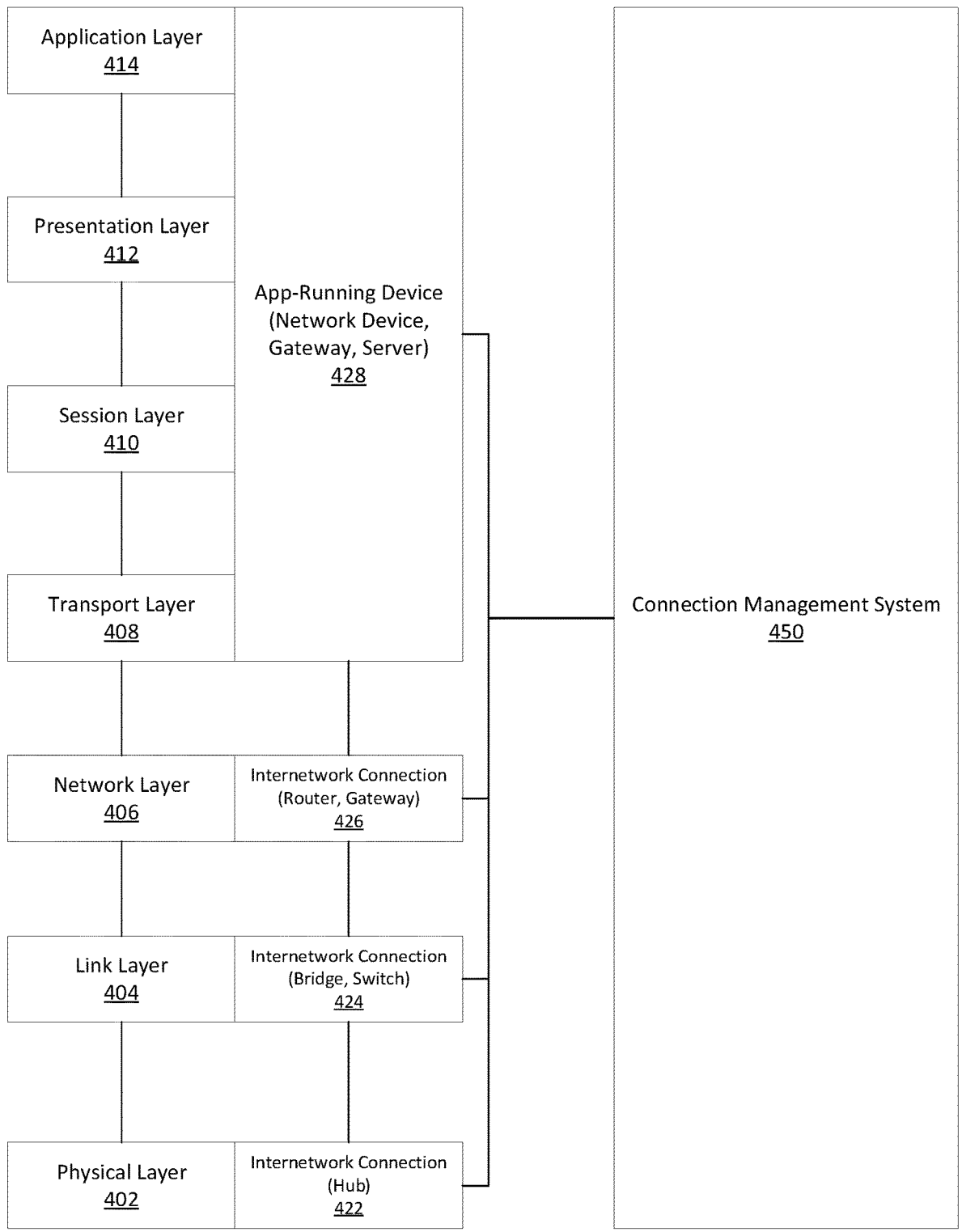
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
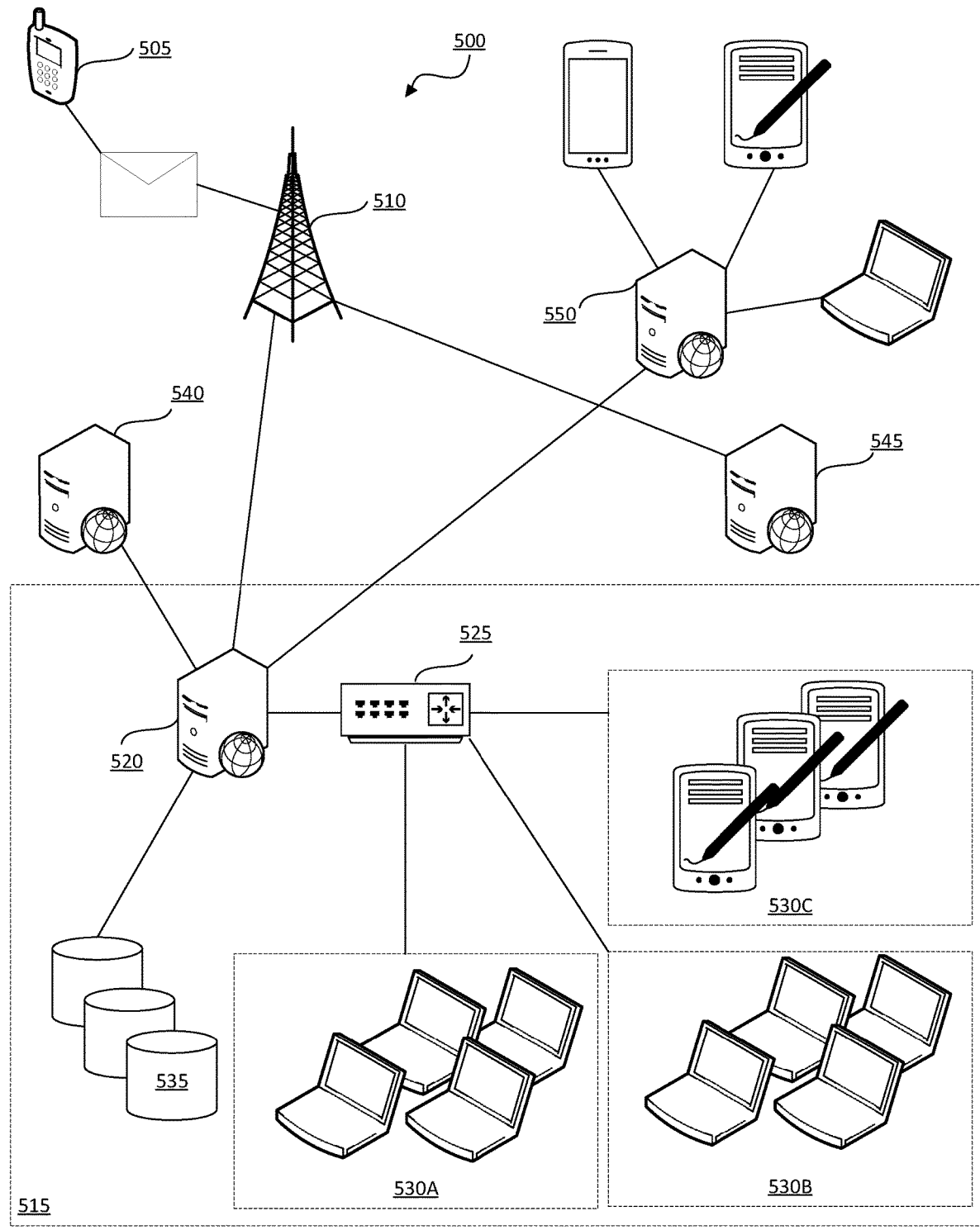
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity) at one or more data stores. Such data may influence communication routing.

Notably, various other devices can further be used to influence communication routing and/or processing. For example, in the depicted instance, connection management system 520 also is connected to a web server 540. Thus, connection management system 520 can retrieve data of interest, such as technical item details, and so on.

Network device 505 may also be connected to a web server (e.g., including a web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) behavior of a given user or class of users.

Figure 6:
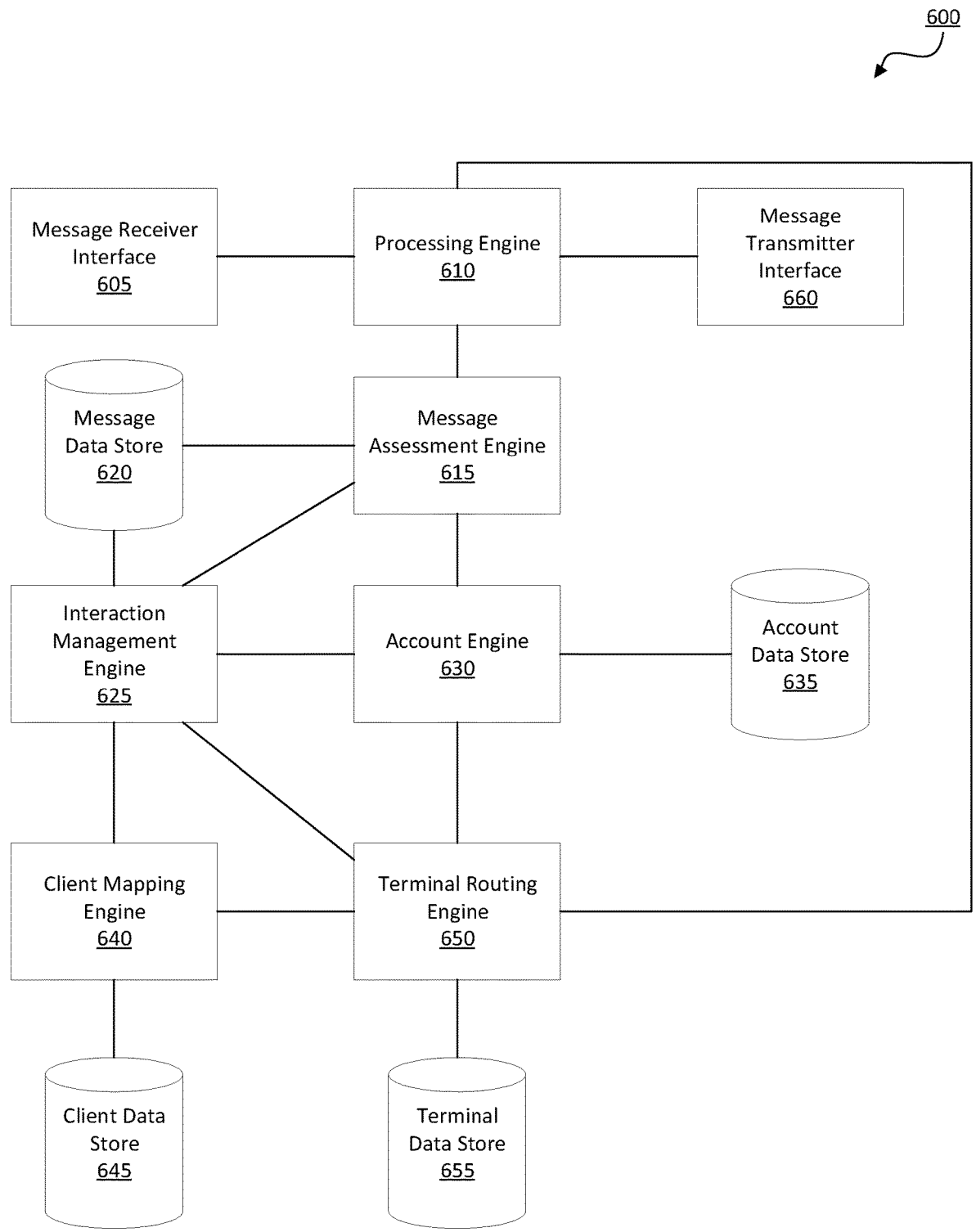
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a same user or profile) has previously communicated with a given terminal device, communication routing can be generally biased towards the same terminal device. Other factors that may influence routing can include, for example, whether the terminal device (or corresponding agent) is available and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device, a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client). In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters.

With regard to determining how devices are to communicate, interaction management engine 625 can (for example) determine whether a terminal device is to respond to a communication via (for example) SMS message, voice call, video communication, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This bias can persist even across message series. In some instances, a representation of a continuous channel (e.g., identifying an agent) can be included in a presentation to be presented on a network device. In this manner, a user can understand that communications are to be consistently routed so as to promote efficiency.

In one instance, a parameter can be generated using one or more factors described herein and a rule (e.g., that includes a weight for each of the one or more factors) to determine a connection parameter corresponding to a given network device and terminal device. The parameter may pertain to an overall match or one specific to a given communication or communication series. Thus, for example, the parameter may reflect a degree to which a given terminal device is predicted to be suited to respond to a network-device communication. In some instances, a parameter analysis can be used to identify each of a terminal device to route a given communication to and whether to establish, use or terminate a connection channel. When a parameter analysis is used to both address a routing decision and a channel decision, a parameter relevant to each decision may be determined in a same, similar or different manner.

Thus, for example, it will be appreciated that different factors may be considered depending on whether the parameter is to predict a strength of a long-term match versus one to respond to a particular message query. For example, in the former instance, considerations of overall schedules and time zones may be important, while in the latter instance, immediate availability may be more highly weighted. A parameter can be determined for a single network-device/terminal-device combination, or multiple parameters can be determined, each characterizing a match between a given network device and a different terminal device.

To illustrate, a set of three terminal devices associated with a client may be evaluated for potential communication routing. A parameter may be generated for each that relates to a match for the particular communication. Each of the first two terminal devices may have previously communicated with a network device having transmitted the communication. An input from the network device may have indicated positive feedback associated with an interaction with the communication(s) with the first device. Thus, a past-interact sub-parameter (as calculated according to a rule) for the first, second and third devices may be 10, 5, and 0, respectively. (Negative feedback inputs may result in negative sub-parameters.) It may be determined that only the third terminal device is available. It may be predicted that the second terminal device will be available for responding within 15 minutes, but that the first terminal device will not be available for responding until the next day. Thus, a fast-response sub-parameter for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-parameters of 3, 4 and 9. In this example, the rule does not include weighting or normalization parameters (though, in other instances, a rule may), resulting in parameters of 14, 11 and 19. Thus, the rule may indicate that the message is to be routed to a device with the highest parameter, that being the third terminal device. If routing to a particular terminal device is unsuccessful, the message can be routed to a device with the next-highest parameter, and so on.

A parameter may be compared to one or more absolute or relative thresholds. For example, parameters for a set of terminal devices can be compared to each other to identify a high parameter to select a terminal device to which a communication can be routed. As another example, a parameter (e.g., a high parameter) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Systems and methods for dynamically switching between bots and terminal devices (e.g., operated by live agents) during communication sessions with network devices (e.g., operated by users) is provided. In some implementations, bots can be configured to autonomously communicate with network devices. Further, bots can be configured for a specific capability. Examples of capabilities can include updating database records, providing updates to users, providing additional data about the user to agents, determining a user's intent and routing the user to a destination system based on the intent, predicting or suggesting responses to agents communicating with users, escalating communication sessions to include one or more additional bots or agents, and other suitable capabilities. In some implementations, while a bot is communicating with a network device (e.g., operated by the user) during a communication session (e.g., using a chat-enabled interface), a communication server can automatically and dynamically determine to switch the bot with a terminal device. For example, bots can communicate with users about certain tasks (e.g., updating a database record associated with a user), whereas, terminal devices can communicate with users about more difficult tasks (e.g., communicating using a communication channel to solve a technical issue).

In some implementations, determining whether to switch between a bot and a terminal device during a communication session can be based on an analysis of one or more characteristics of the messages in a communication session. Further, a dynamic sentiment parameter can be generated to represent a sentiment of messages, conversations, entities, agents, and so on. For example, in cases where the dynamic sentiment parameter indicates that the user is frustrated with the bot, the system can automatically switch the bot with a terminal device so that a live agent can communicate with the user. See U.S. Ser. No. 15/171,525, filed Jun. 2, 2016, the disclosure of which is incorporated by reference herein in its entirety for all purposes. In some examples, determining whether to switch between the bots and terminal devices can be performed without a prompt from a user. The determination can be performed automatically at the communication server based any number of factors, including characteristics of the current messages in the communication session (e.g., chat), characteristics of previous messages transmitted by the user in previous communication sessions, a trajectory of a characteristic (e.g., a sentiment) over multiple messages in a conversation, or additional information associated with the user (e.g., profile information, preference information, and other suitable information associated with the user).

Figure 7:
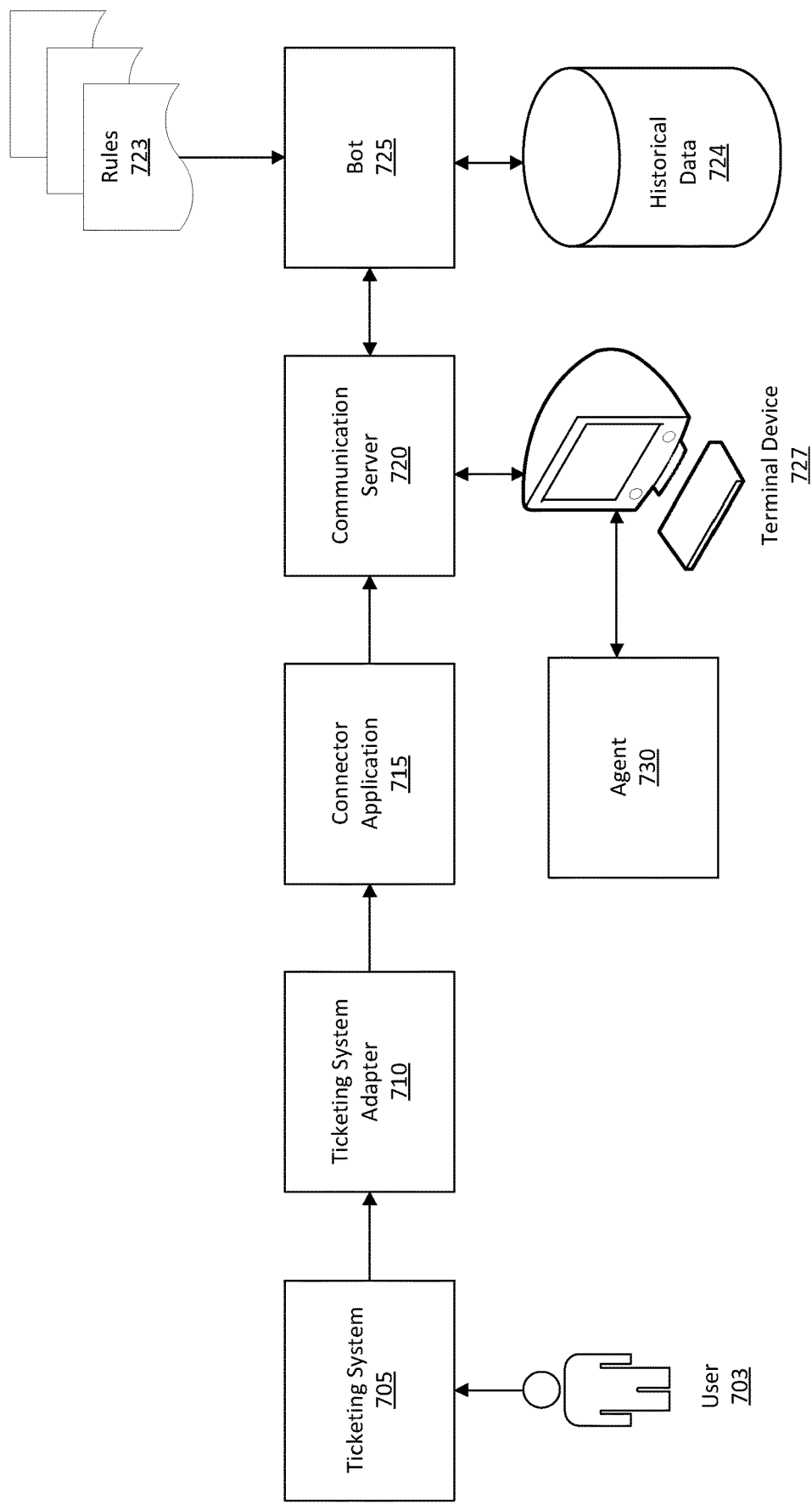
FIG. 7 shows a block diagram of a system for integrating an external system for routing of messages during communication sessions according to some embodiments.

FIG. 7 shows a block diagram of a system for integrating an external system for routing of messages during communication sessions. In some implementations, the system can include a user 703, a ticketing system 705, a ticketing system adapter 710, a connector application 715, a communication server 720, a terminal device 727, an agent 730, and a bot 725. In some implementations, the bot 725 may be in operative communication with rules 723 (i.e., stored in a rules database) and historical data 724, as described further herein. The components illustrated in FIG. 7 may be connected over any suitable network, including local area networks (LANs), wide area networks (WANs), cellular networks, combinations thereof, and/or the like.

A user 703 may access a ticketing system 705. The user 703 may have an issue, complaint, or inquiry that may require ticketing system 705 to open a ticket, i.e., an issue ticket. The issue ticket may be a message that may be tracked from inception through to resolution. In some embodiments, the ticketing system 705 may be an external system that exists outside of the other components of the system shown in FIG. 7. The ticketing system 705 may operate independently and according to its own rules, language, and procedures.

In order to interface with the other components of the system shown in FIG. 7, the ticketing system 705 may use a ticketing system adapter 710. The ticketing system adapter 710 may be a hardware and/or software component adapted to facilitate ticketing system 705 to interface with one or more of the other components of the system shown in FIG. 7. Similarly, connector application 715 may be used to adapt communications, tickets, and messages passed by ticketing system 705 into a format and mode understandable and/or usable by communication server 720. In that sense, connector application 715 may serve as a bridge between the ticketing system adapter 710 and the communication server 720.

Although shown and described with respect to a ticketing system 705, it is contemplated that the system illustrated in FIG. 7 may be fully functional with respect to the operations described herein with respect to any external system. For example, ticketing system 705 may instead be a social networking system or any other external system that exchanges messages in a particular format, such as customer relationship management (CRM) systems. These messages may be converted into a format usable by the system illustrated in FIG. 7 and processed accordingly.

Communication server 720 may be a server with one or more processors with at least one storage device, and can be configured to perform methods and techniques described herein. For example, communication server 720 can manage message exchange and communication sessions between ticketing system 705 (in communication with user 703) and a terminal device 727 (operated by an agent 730). Communication server 720 can establish a communication channel between ticketing system 705, terminal device 727, and bot 725, so that messages can be exchanged between the entities to facilitate resolution of a ticket. However, the present disclosure is not limited to the exchange of messages during a communication session. Other forms of communication can be facilitated by the communication session, such as video communication (e.g., a video feed) and audio communication (e.g., a Voice Over IP connection). In addition, communication server 720 can be associated with a platform. Clients (e.g., an external system to the platform) can deploy bots in their internal communication systems using the platform. In some examples, clients can use their own bots in the platform, which enables clients to implement the methods and techniques described herein into their internal communication systems.

In some implementations, communication server 720 can establish a communication session between ticketing system 705 and bot 725. Bot 725 can be code that, when executed, is configured to autonomously communicate with ticketing system 705. For example, bot 725 can be a bot that automatically determines an action to be taken based on tickets or messages initiated by the user 703 with the ticketing system 705. This may be based on machine learning or artificial intelligence, for example. For instance, a machine learning model or artificial intelligence may be trained using supervised training techniques, whereby a sample data set comprising pairings of an input (e.g., samples tickets or messages) and a desired output (e.g., the action to be taken). The sample inputs may be utilized by the machine learning model or artificial intelligence to generate actions that are to be taken in response to the sample inputs. These actions may be compared to the desired actions from the sample data set to determine an error of the machine learning model or artificial intelligence. Based on this error, the model coefficients of the machine learning model or artificial intelligence may be updated, resulting in an updated machine learning model or artificial intelligence. This process may continue until the resulting error is within an accuracy threshold, whereby the machine learning model or artificial intelligence produces outputs (e.g., actions) that achieve at least a pre-defined or current level of accuracy. In an embodiment, the sample data set may include historical data comprising previously received messages and corresponding actions performed in response to the messages. Further, the machine learning model or artificial intelligence may be programmed or implemented subject to a set of rules that define one or more parameters for selecting actions that are to be performed based on intents identified from obtained messages. Actions may include to route the ticket or message to an agent 730 via terminal device 727 to facilitate resolution, to facilitate automated resolution of the ticket (e.g., by facilitating bill pay, address change, and the like directly by the bot 725), etc.

Bot 725 may determine the action to be taken based on one or more rules 723. Rules 723 may define how a particular message is handled based on the content of the message. The message may be parsed, in some embodiments, to determine an intent. Certain intents, such as bill pay, address change, and other intents that can be performed automatically without human intervention may be processed and resolved automatically by bot 725 according to rules 723.

Bot 725 may also consult historical data 724 to determine how to process a particular ticket or message. For example, bot 725 may extract an intent from a message, then look for previous messages with similar intents in historical data 724. If a similar message is located in historical data 724 (or a group of messages with similar patterns), bot 725 may determine how the similar message was resolved and execute a similar action in order to resolve the current ticket. Bot 725 can then save the current message and action in the historical data 724 (as well as whether the action resolved the issue) in order to be used in future decisions regarding how to resolve future issues. In this sense, bot 725 may implement artificial intelligence (AI) and/or machine learning techniques to build models and resolve issues autonomously using rules 723 and historical data 724.

In some implementations, bot 725 can be defined by one or more sources. For example, data stores (not shown) can store code representing bots that are defined (e.g., created or coded) by clients of the communication server 720. For example, a client that has defined its own bots can load the bots to the communication server 720. The bots defined by clients can be stored in a data store (not shown). The data store can store code representing bots that are defined by third-party systems. For example, a third-party system can include an independent software vendor. In some embodiments, an additional data store (not shown) can store code representing bots that are defined by an entity associated with communication server 720. For example, bots that are coded by the entity can be loaded to or accessible by communication server 720, so that the bots can be executed and autonomously communicate with users. In some implementations, communication server 720 can access bots stored in any of the data stores using cloud network (not shown). The cloud network may be any network, and can include an open network, such as the Internet, personal area network, local area network (LAN), campus area network (CAN), metropolitan area network (MAN), wide area network (WAN), wireless local area network (WLAN), a private network, such as an intranet, extranet, or other backbone.

In addition, terminal device 727 can be operated by an agent 730. Terminal device 727 can be any portable (e.g., mobile phone, tablet, laptop) or non-portable device (e.g., electronic kiosk, desktop computer, etc.). In some instances, the agent 730 can access a website using a browser that is running on terminal device 727. For example, the website can include a console or platform that is running on the browser of terminal device 727. The agent 730 can be logged into the platform using the browser. One or more login credentials (e.g., username, password, and the like) can be used to authenticate the agent 730's identity before allowing the agent 730 to gain access to the console or web applications included in the console. Examples of a console can include a platform that includes one or more APIs (application programming interfaces), a dashboard including one or more functions, a web-hosted application running on a web browser (without the need for downloading plug-ins) that is capable of establishing or joining a communication session, and other suitable interfaces. Further, the console can include one or more web applications or functions that can be executed. The web applications or functions can be executed at the browser, at communication server 720, a local server, a remote server, or other suitable computing device. For example, the web applications, native applications, or functions can enable an agent to communicate with a user, and to view communications between the user and one or more bots.

In some implementations, communication server 720 can be configured to dynamically switch between bot 725 and terminal device 727 during a particular communication session. For example, communication server 720 can facilitate a communication session ticketing system 705 and bot 725. Bot 725 can be configured to autonomously communicate with ticketing system 705 by exchanging one or more messages with the ticketing system 705 during the communication session. Communication server 720 can dynamically determine whether to switch bot 725 with terminal device 727 (or in some cases, vice versa) so that a live agent can communicate with user 703, instead of bot 725. In some implementations, the switching can be performed without a prompt from the ticketing system 705 or terminal device 727. For example, the switching can be based on message parameters (e.g., scores representing sentiment of a message or series of messages) of the messages exchanged between the ticketing system 705 and the bot 725, without prompting the user 703 to request a terminal device.

In some implementations, communication server 720 can determine to switch between bot 725 and terminal device 727 automatically based on characteristics of the messages exchanged between the bot 725 and the ticketing system 705. In some instances, analyzing the text of a message to determine the characteristic (e.g., the message parameter) can include an analysis of textual or non-textual attributes associated with the message. For example, communication server 720 can extract one or more lines of text included in the message from ticketing system 705. Communication server 720 can identify whether the one or more lines of text include an anchor. Examples of an anchor include a string of text associated with a polarity (e.g., sentiment or intent, the word "frustrated" corresponding to a negative polarity or frustrated polarity, the word "happy" corresponding to a positive polarity, and so on). For example, a term "dispute" for one client can be negative, but can be neutral or positive for a second client. In some instances, anchors can be dynamically determined using supervised machine learning techniques. For example, one or more clustering algorithms can be executed on stored messages to find patterns within the stored messages. The clustered messages can be further filtered and evaluated to determine the anchor. Further, one or more words near the identified anchor can be parsed for amplifiers. An example of an amplifier is a term that increases or decreases an intensity associated with the polarity of the anchor, such as "really," "not really," "kind of," and so on. The characteristic can include, for example, the speed of typing, the number of special characters used in the message (e.g., exclamation points, question marks, and so on), a semantic analysis of a message (e.g., by identifying keywords, sentence structures, repeated words, punctuation characters and/or non-article words); user input (e.g., having selected one or more categories); and/or message-associated statistics (e.g., response latency).

In some implementations, communication server 720 and/or bot 725 may recommend or predict responses to messages received from ticketing system 705. For example, communication server 720 can include a message recommendation system, which can evaluate messages received from ticketing system 705 and use a machine-learning model to recommend responses to those received messages. The message recommendation system can display a set of recommended messages on terminal device 727 to assist the agent in communicating with user 703.

Figure 8:
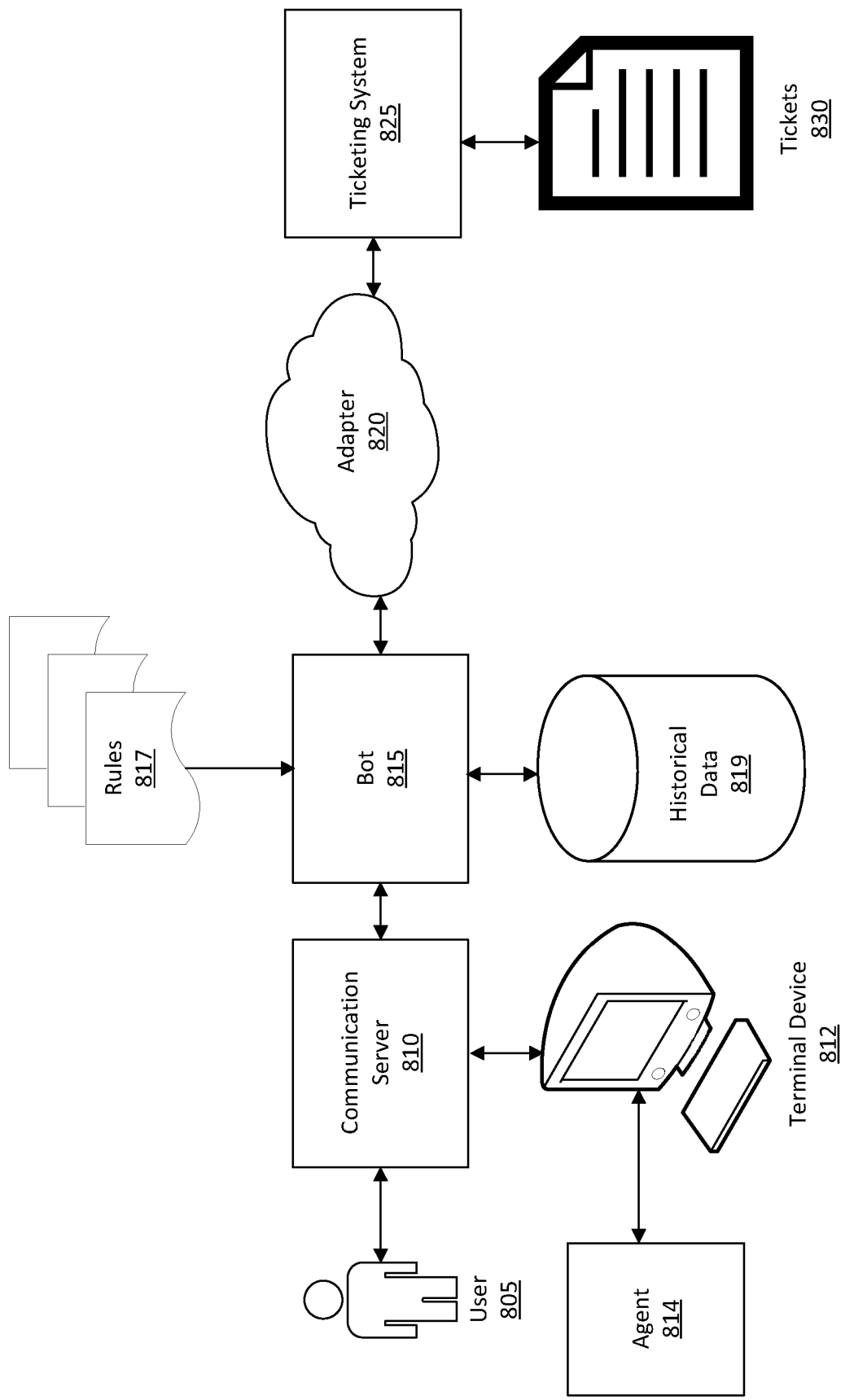
FIG. 8 shows a block diagram of a system for integrating an external system with internal communications according to some embodiments.

FIG. 8 shows a block diagram of a system for integrating an external system with internal communications according to some embodiments. The system illustrated in FIG. 8 includes a user 805, a communication server 810, a terminal device 812, an agent 814, a bot 815, rules 817, historical data 819, an adapter 820, a ticketing system 825, and tickets 830. The entities and components of the system illustrated in FIG. 8 operates similarly to the system illustrated and described with respect to FIG. 7.

However, in FIG. 8, the user 805 may initiate a message with the communication server 810 directly. The communication server 810 may route this message to the bot 815 which may, via an adapter 820, route the message to a ticketing system 825. The ticketing system 825 may create one or more tickets 830 that may be used to track the message through resolution across the system shown in FIG. 8.

Figure 9:
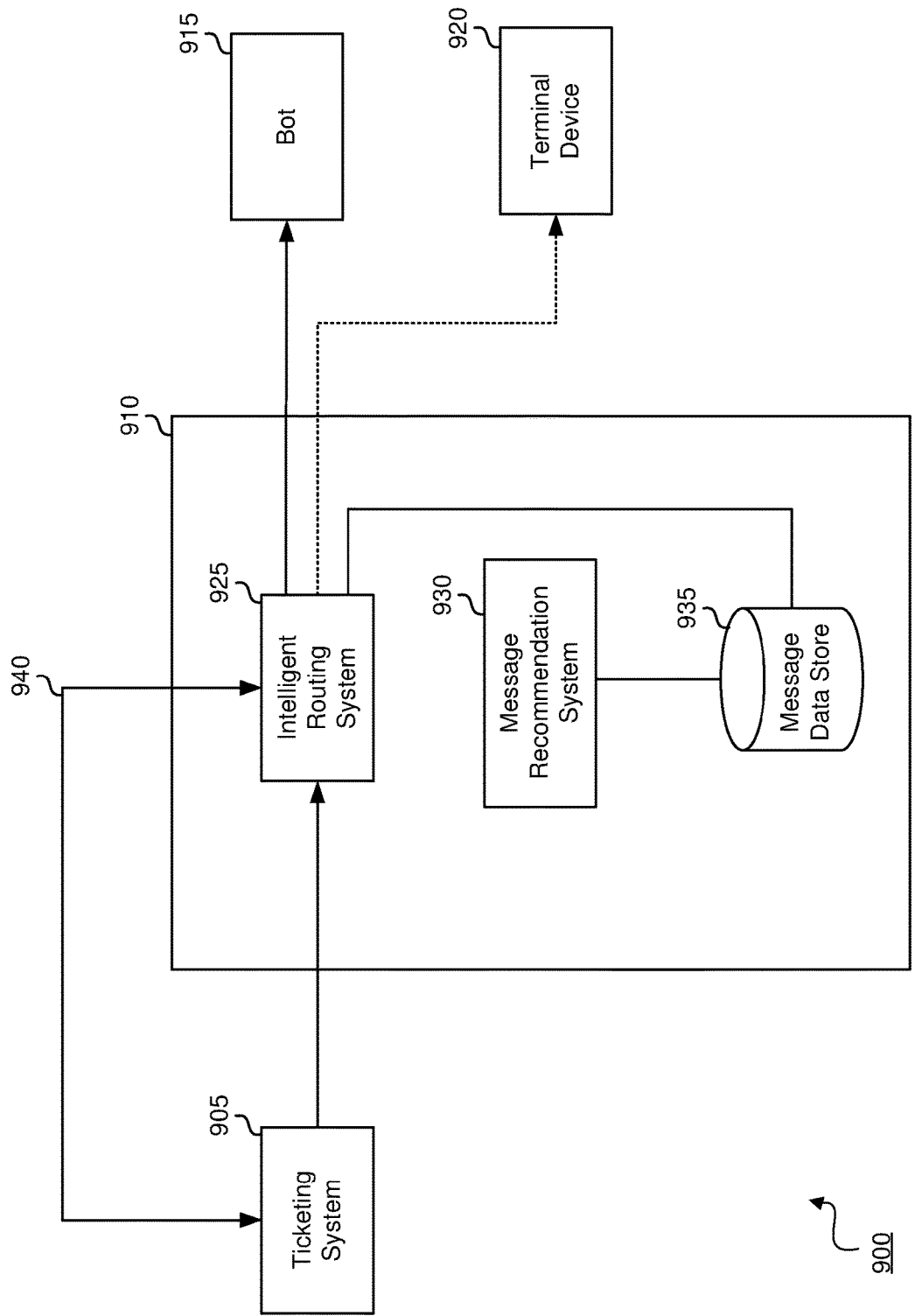
FIG. 9 shows a block diagram representing network environment for enhancing endpoint selection using machine-learning techniques.

FIG. 9 shows a block diagram representing network environment 900 for enhancing endpoint selection using machine-learning techniques. Network environment 900 may include ticketing system 905, communication server 910, bot 915 and terminal device 920. Communication server 910 can facilitate the establishment of a communication channel that enables ticketing system 905 and at least one bot 915 and terminal device 920 to communication.

Communication server 910 may include intelligent routing system 925, message recommendation system 930, and message data store 935. Each of intelligent routing system 925 and message recommendation system 930 may include one or more computing devices with a processor and a memory that execute instructions to implement certain operations. In some implementations, intelligent routing system 925 may be a bot configured to intelligently route communications received from ticketing systems to the appropriate destination. Intelligent routing system 925 may include one or more processors configured to execute code that causes one or more machine-learning techniques or artificial intelligence techniques to intelligently route messages. In some implementations, intelligent routing system 925 can execute one or more machine-learning techniques to train a model that predicts a destination associated with a message received from network device 905.

As a non-limiting example, intelligent routing system 925 may receive a message from ticketing system 905 through a communication channel established or facilitated by communication server 910 (e.g., a native application configured to enable users to communicate with each other across various devices). Intelligent routing system 925 may evaluate the incoming message according to certain embodiments described above. For example, intelligent routing system 925 may evaluate the content (e.g., text, audio clips, images, emoticons, or other suitable content) included in the received message using a trained machine-learning model. The content of the message can be inputted into the machine-learning model to generate a predicted destination (e.g., a particular terminal device or bot). The machine-learning model may be continuously trained based on feedback signal 940 received from network device 905. In some implementations, intelligent routing system 925 may request an acknowledgement from network device 905 of the predicted destination. As a non-limiting example, intelligent routing system 925 may evaluate the message using a machine-learning technique, and a result of the evaluation may include a predication that bot 915 is the destination for the message. To confirm, intelligent routing system 925 may automatically request feedback signal 940. For example, feedback signal 940 may include a request for ticketing system 905 to acknowledge whether bot 915 is the correct destination for the message (e.g., "Is Technical Support the correct destination?"). If ticketing system 905 transmits the acknowledgement that bot 915 is the correct destination (e.g., the destination intended by the user operating network device 905), then intelligent routing system 925 may train the machine-learning model to predict that future messages including the exact or similar content (e.g., a threshold of similarity, such as 10 percent difference in content) as the received message are to be routed to bot 915. However, if intelligent routing system 925 receives feedback signal 940 indicating that bot 915 is not the correct or intended destination for the received message, but rather terminal device 920 was the correct or intended destination, intelligent routing system 925 can train the machine-learning model that future messages including the exact or similar content as the received message are to be routed to terminal device 920 (instead of bot 915). In some implementations, intelligent routing system 925 may not immediately update or train the machine-learning model to route future messages to terminal device 920, but rather, intelligent routing system 925 may wait for a threshold number of incorrect routings to bot 915 before routing all future messages with the exact same or similar content as the received message to terminal device 920. As a non-limiting example, intelligent routing system 925 may begin routing future messages (that were predicted to be routed to bot 915) to terminal device 920 instead of bot 915 after five instances of network devices transmitting feedback signals indicating that bot 915 is not the correct or intended destination.

In some embodiments, intelligent routing system 925 may select where to route a given message based on bids received to handle a particular request in the message. Intelligent routing system 925 may broadcast an intent to disparate services and determine who wants to bid on handling the request. Bidding parties may respond with their level of confidence in successfully handling the request and a plan to execute handling of the request. Intelligent routing system 925 may evaluate all of the responses from the bidding parties and, based on machine learning policies, determine which bidding party to use for a given message.

Message data store 935 may store some (e.g., but not all) or all messages received in the past from one or more network devices. Further, message data store 935 may also store some or all messages transmitted by terminal devices or bots during previous communication sessions with network devices. Message data store 935 may also store some or all messages transmitted by network devices to bots during communication sessions. Further, message data store 935 may store some or all messages transmitted by bots to network devices during communication sessions. In some implementations, message data store 935 may be a database of all messages processed (e.g., transmitted by or received at) communication server 910.

Message recommendation system 930 may analyze the database of messages stored at message data store 935. In some implementations, message recommendation system 930 may evaluate the messages stored at message data store 935 using one or more machine-learning algorithms or artificial intelligence algorithms. For example, message recommendation system 930 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of messages stored in message data store 935.

In some implementations, a recurrent neural network (RNN) or a convolutional neural network (CNN) may be used to predict response messages to assist the agent. In some implementations, message recommendation system 930 may use support vector machines (SVM), supervised, semi-supervised, ensemble techniques, or unsupervised machine-learning techniques to evaluate all previous messages to predict responses to incoming messages received from network devices during communication sessions.

For example, message recommendation system 930 may evaluate the content of messages received from network devices (or messages received at communication server 910 from bots or terminal devices) and compare the results of the evaluation to the one or more clusters of previous messages stored in message data store 935. Once the cluster is identified, message recommendation system 930 can identify the most relevant response messages based on a confidence threshold. For example, an incoming message (e.g., received at communication server 910 from ticketing system 905) may correspond to a technical issue based on the content of the incoming message. Message recommendation system 930 can identify that the incoming message corresponds to a technical issue based on an evaluation of the content of the incoming message (e.g., text evaluation). In some embodiments, message recommendation system 930 may use artificial intelligence and machine learning to evaluate a CRM message. Message recommendation system 930 can access message data store 935 to identify the cluster of messages associated with technical issues. Message recommendation system 930 can select one or more responses messages within the cluster of messages based on a confidence threshold. As a non-limiting example, a confidence algorithm can be executed to generate a confidence score. A confidence score may be a percentage value where the lower the percentage, the less likely the response is a good prediction for the incoming message, and the higher the percentage, the more likely the response is a good prediction for the incoming message. A minimum confidence threshold may be defined as a measure of certainty or trustworthiness associated with each discovered pattern. Further, an example of a confidence algorithm may be the Apriori Algorithm, similarity algorithms indicating similarity between two data sets, and other suitable confidence algorithms.

Figure 10:
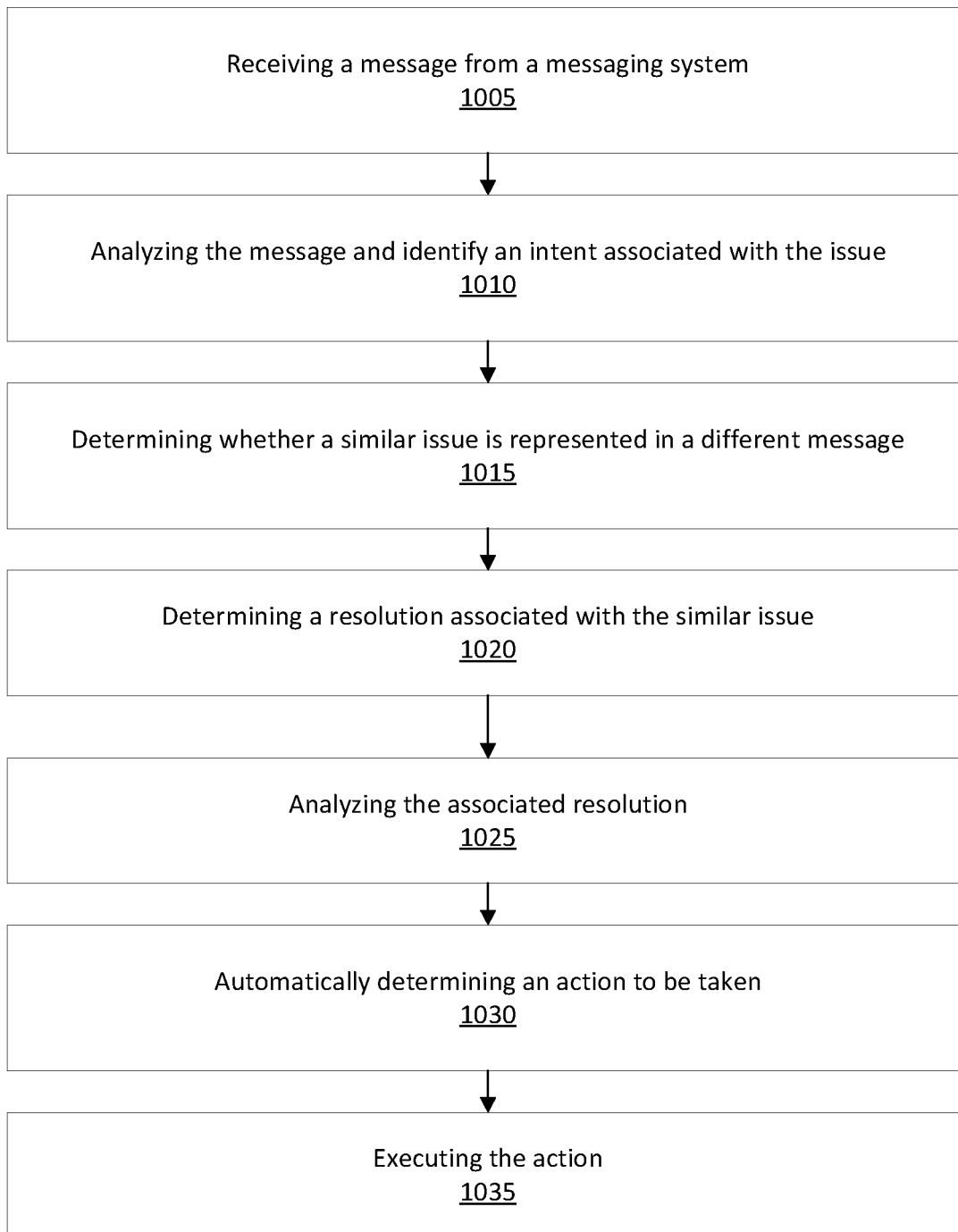
FIG. 10 shows an example process for external system integration according to some embodiments.

FIG. 10 shows an example process for external system integration according to some embodiments. At step 1005, a message may be received from a messaging system. The message may be associated with a user. The message may represent an issue that the user wants resolved. For example, the message may state, "My order was defective." The message may have been passed to the messaging system via a network device, as described herein. The messaging system may be any external or third party system with a specified format or means for communication.

At step 1010, the message may be analyzed to identify an intent associated with the issue. The intent may correspond to the issue and a possible resolution. For example, for the message, "My order was defective", the intent may be identified as "Defective order, I want a replacement or a refund."

At step 1015, it may be determined whether a similar issue is represented in a different message. For example, a historical database including data from previous messages and identified intents may be accessed to see if another message has previously been received identifying a defective order. At step 1020, it may be determined whether a resolution is associated with the similar issue. If a resolution is associated with the similar issue, it may be identified and analyzed at step 1025.

At step 1030, an action to be taken may be automatically determined. Automatically determining the action to be taken may include applying a rule and artificial intelligence to the intent and the analyzed resolution. In some embodiments, applying artificial intelligence may include analyzing previous tickets from the user. In some embodiments, applying artificial intelligence may include analyzing conversation tone.

The action may be associated with an increased likelihood for possible resolution of the issue. For example, the resolution of the previous similar message may be used to determine the proper resolution for the current message. If the resolution was favorable with respect to the previous message, there may be an increased likelihood for the resolution to also be favorable with respect to the current message. In some embodiments, a plug-in may be used to automatically determine the action to be taken.

At step 1036, execution of the action may be facilitated. In some embodiments, the action may be executed within the messaging system. In some embodiments, information corresponding to the action may be stored and the information and artificial intelligence may be used to determine a future action. In some embodiments, the action may include routing the message to an agent.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method, comprising:
   dynamically detecting ongoing messages exchanged in real-time during a live communications session between a user and an agent, wherein the live communications session is associated with an issue that the user wants resolved;
   training a machine learning model using the ongoing messages and historical data, wherein the historical data includes one or more previously received messages and response messages associated with known issues;
   applying the machine learning model to the ongoing messages to automatically predict one or more response messages for the ongoing messages;
   generating a recommendation, wherein the recommendation includes the one or more response messages for the ongoing messages, and wherein when the recommendation is generated, the recommendation is displayed on a terminal device associated with the agent;
   monitoring the live communications session, wherein monitoring includes real-time analysis of textual or non-textual attributes of the ongoing messages; and
   dynamically updating the machine learning model based on the ongoing messages, the recommendation, and the textual or non-textual attributes of the ongoing messages.

2. The computer-implemented method of claim 1, wherein:
   the machine learning model generates confidence scores for the response messages associated with the known issues; and
   the one or more response messages are automatically predicted based on the confidence scores.

3. The computer-implemented method of claim 1, further comprising:
   applying the machine learning model to the historical data to generate one or more clusters for the one or more previously received messages and the response messages; and
   identifying a cluster from the one or more clusters based on the ongoing messages, wherein the cluster is identifying by applying the machine learning model to the ongoing messages.

4. The computer-implemented method of claim 1, wherein applying the machine learning model includes analyzing conversation tone from the ongoing messages.

5. The computer-implemented method of claim 1, further comprising:
   receiving a message associated with the user, wherein the message represents the issue; and
   facilitating the live communications session between the user and the agent, wherein the live communications session is facilitated based on a dynamic evaluation of the message in real-time.

6. The computer-implemented method of claim 1, further comprising:
   receiving a message associated with the user, wherein the message represents the issue; and
   facilitating the live communications session between the user and the agent, wherein the live communications session is facilitated based on a bid corresponding to a level of confidence in handling the issue, and wherein the bid is submitted by a service associated with the agent.

7. The computer-implemented method of claim 1, wherein the ongoing messages are exchanged using a customer relationship management (CRM) format.

8. A system, comprising:
   one or more processors; and
   memory storing thereon instructions that, as a result of being executed by the one or more processors, cause the system to:
   dynamically detect ongoing messages exchanged in real-time during a live communications session between a user and an agent, wherein the live communications session is associated with an issue that the user wants resolved;
   train a machine learning model using the ongoing messages and historical data, wherein the historical data includes one or more previously received messages and response messages associated with known issues;
   apply the machine learning model to the ongoing messages to automatically predict one or more response messages for the ongoing messages;
   generate a recommendation, wherein the recommendation includes the one or more response messages for the ongoing messages, and wherein when the recommendation is generated, the recommendation is displayed on a terminal device associated with the agent;

monitor the live communications session, wherein monitoring includes real-time analysis of textual or non-textual attributes of the ongoing messages; and dynamically update the machine learning model based on the ongoing messages, the recommendation, and the textual or non-textual attributes of the ongoing messages.

9. The system of claim 8, wherein:

the machine learning model generates confidence scores for the response messages associated with the known issues; and the one or more response messages are automatically predicted based on the confidence scores.

10. The system of claim 8, wherein the instructions further cause the system to:

apply the machine learning model to the historical data to generate one or more clusters for the one or more previously received messages and the response messages; and identify a cluster from the one or more clusters based on the ongoing messages, wherein the cluster is identifying by applying the machine learning model to the ongoing messages.

11. The system of claim 8, wherein the instructions that cause the system to apply the machine learning model further cause the system to analyze conversation tone from the ongoing messages.

12. The system of claim 8, wherein the instructions further cause the system to:

receive a message associated with the user, wherein the message represents the issue; and facilitate the live communications session between the user and the agent, wherein the live communications session is facilitated based on a dynamic evaluation of the message in real-time.

13. The system of claim 8, wherein the instructions further cause the system to:

receive a message associated with the user, wherein the message represents the issue; and facilitate the live communications session between the user and the agent, wherein the live communications session is facilitated based on a bid corresponding to a level of confidence in handling the issue, and wherein the bid is submitted by a service associated with the agent.

14. The system of claim 8, wherein the ongoing messages are exchanged using a customer relationship management (CRM) format.

15. A non-transitory, computer-readable storage medium storing thereon executable instructions that, as a result of being executed by one or more processors of a computer system, cause the computer system to:

dynamically detect ongoing messages exchanged in real-time during a live communications session between a user and an agent, wherein the live communications session is associated with an issue that the user wants resolved;

train a machine learning model using the ongoing messages and historical data, wherein the historical data includes one or more previously received messages and response messages associated with known issues;

apply the machine learning model to the ongoing messages to automatically predict one or more response messages for the ongoing messages;

generate a recommendation, wherein the recommendation includes the one or more response messages for the ongoing messages, and wherein when the recommendation is generated, the recommendation is displayed on a terminal device associated with the agent;

monitor the live communications session, wherein monitoring includes real-time analysis of textual or non-textual attributes of the ongoing messages; and dynamically update the machine learning model based on the ongoing messages, the recommendation, and the textual or non-textual attributes of the ongoing messages.

16. The non-transitory, computer-readable storage medium of claim 15, wherein:

the machine learning model generates confidence scores for the response messages associated with the known issues; and the one or more response messages are automatically predicted based on the confidence scores.

17. The non-transitory, computer-readable storage medium of claim 15, wherein the executable instructions further cause the computer system to:

apply the machine learning model to the historical data to generate one or more clusters for the one or more previously received messages and the response messages; and identify a cluster from the one or more clusters based on the ongoing messages, wherein the cluster is identifying by applying the machine learning model to the ongoing messages.

18. The non-transitory, computer-readable storage medium of claim 15, wherein the executable instructions that cause the computer system to apply the machine learning model further cause the computer system to analyze conversation tone from the ongoing messages.

19. The non-transitory, computer-readable storage medium of claim 15, wherein the executable instructions further cause the computer system to:

receive a message associated with the user, wherein the message represents the issue; and facilitate the live communications session between the user and the agent, wherein the live communications session is facilitated based on a dynamic evaluation of the message in real-time.

20. The non-transitory, computer-readable storage medium of claim 15, wherein the executable instructions further cause the computer system to:

receive a message associated with the user, wherein the message represents the issue; and facilitate the live communications session between the user and the agent, wherein the live communications session is facilitated based on a bid corresponding to a level of confidence in handling the issue, and wherein the bid is submitted by a service associated with the agent.

21. The non-transitory, computer-readable storage medium of claim 15, wherein the ongoing messages are exchanged using a customer relationship management (CRM) format.

* * * * *